No. 730,343. PATENTED JUNE 9, 1903.
A. J. CHURCHWARD.
ALTERNATING CURRENT MOTOR.
APPLICATION FILED MAR. 29, 1897.
NO MODEL.
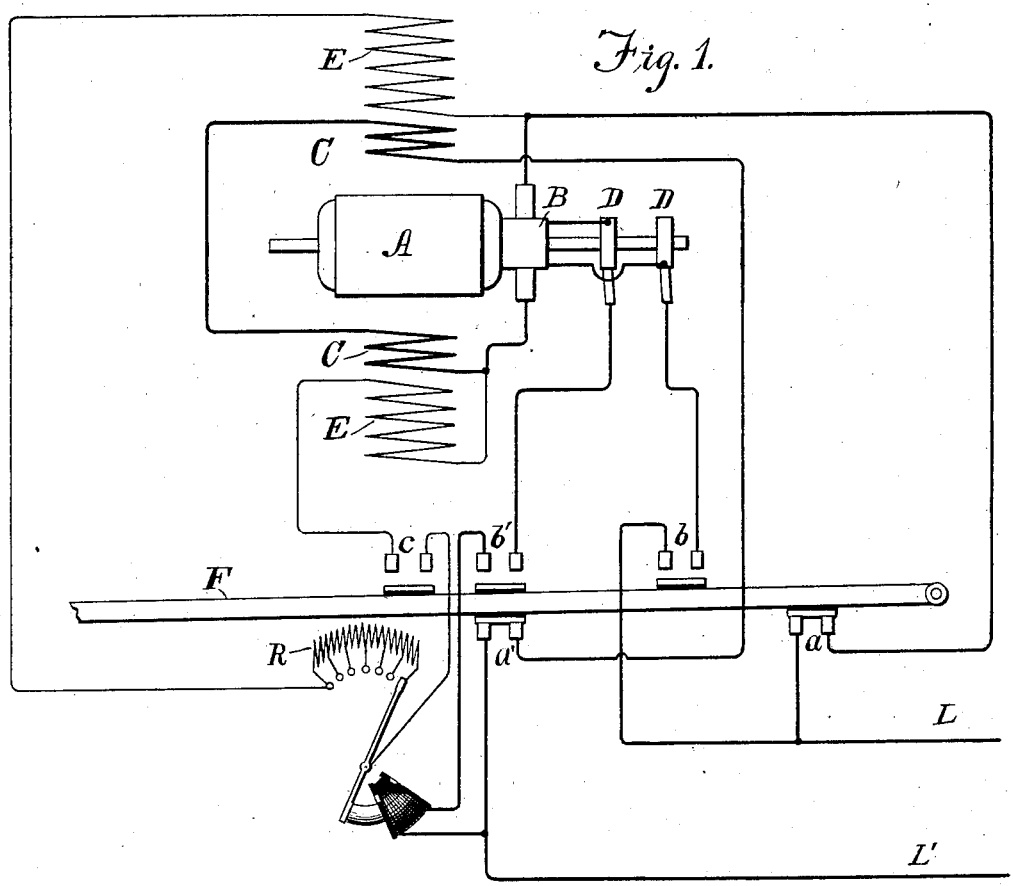
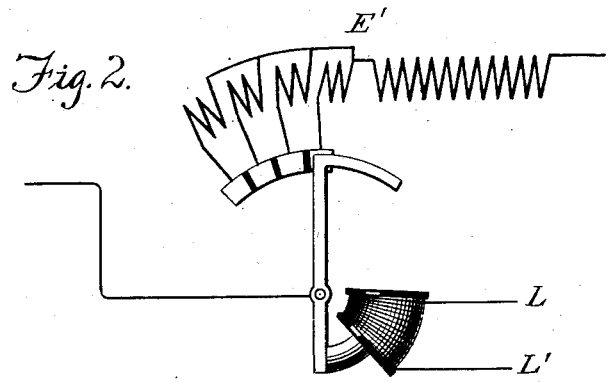
WITNESSES:
C. L. Belcher
Wm H Capel
INVENTOR
Alexander J. Churchward.
BY
HIS ATTORNEY No. 730,343. Patented June 9, 1903.

UNITED STATES PATENT OFFICE.

ALEXANDER J. CHURCHWARD, OF BROOKLYN, NEW YORK.

ALTERNATING-CURRENT MOTOR.

SPECIFICATION forming part of Letters Patent No. 730,343, dated June 9, 1903.

Application filed March 29, 1897. Serial No. 629,850. (No model.)

*To all whom it may concern:*

Be it known that I, ALEXANDER J. CHURCHWARD, a citizen of the United States, and a resident of Brooklyn, in the county of Kings and State of New York, have invented a certain new and useful Alternating-Current Motor, of which the following is a specification.

My invention relates to alternating-current motors suitably organized, constructed, or provided with auxiliary circuits or devices whereby they may be self-starting and brought to synchronous speed and thereafter operated at such synchronous speed.

My invention relates more particularly to the organization and operation of the motor after it is brought to synchronism and while running in synchronism with the alternations, and in this particular is designed to provide for the regulation of the motor automatically or otherwise for differences of load, whereby the motor may be kept at synchronous speed and may not get out of step under conditions of heavy loading, which in ordinary cases would result in causing it to break step with the alternating current fed to it.

A further object of my invention is to provide a simple and efficient alternating-current motor adapted to be run by (single-phase) alternating currents both for starting or non-synchronous operation and for synchronous action.

In the preferred manner of carrying out my invention I organize the motor for self-starting as a continuous or direct current motor, which, as is well known, will start and under the action of (single-phase) alternating currents fed to armature and field will, if not too much loaded, come to synchronous speed. In its self-starting condition the motor preferably has a field-coil in series with the armature. When brought to synchronism, a suitable switch changes the connections, so that alternating current is fed direct to the armature by means of proper rings or continuous contact devices, and the field is excited by continuous current fed thereto from any suitable source over a circuit which is provided with suitable regulating appliances controlled, by preference, automatically in a manner to cause the field to increase in strength with the load. This continuous current may operate in any suitable coils upon the field-magnet; but by preference when such coils are in a circuit formed as a shunt to the armature, so as to take their direct current from it, they are made as high-resistance coils and independent of those used in the non-synchronous operation.

My invention consists, broadly, in the combination, with a self-starting alternating-current motor, of a field coil or circuit for synchronous operation provided with means for throwing it into action, in conjunction with means for regulating its action and causing the field to increase with the load after synchronism is attained.

My invention consists, further, in the combination, with a motor organized for self-starting under the action of (single-phase) alternating currents, of a field-coil in a circuit fed with continuous currents from any desired source during synchronous operation of the apparatus, and means connected therewith for regulating the field to cause it to increase with an increase of the load.

My invention consists also in the special organizations and combinations of apparatus hereinafter described and then specified in the claims.

In the accompanying drawings, Figure 1 is a general diagram of circuits and apparatus suitable for carrying out my invention. Fig. 2 shows a modification in the way of regulating the action of the current which produces the field during synchronous running.

As the winding of the armature, the armature structure, the number of poles therein and in the field are largely matters of choice and inasmuch as the mechanical construction of the switch and its contacts is capable of many variations, while yet permitting the same changes of circuits and connections to be made, the invention is illustrated mainly diagrammatically.

A is the armature, provided with any desired or usual direct or continuous current winding and commutator suitable therefor and indicated at B.

C C are field-coils used in the starting or non-synchronous operation under the action of the single-phase alternating currents and are preferably a series field-coil in series circuit with the armature during such operation.

D D are collector-rings and brushes connected to the armature-coils in any usual way and serving to feed alternating currents direct thereto for synchronous operation of the machine, and E E are field-coils fed with continuous current from any source during the synchronous operation. In the present instance they are for such purpose connected in shunt to the armature by connection to the brushes of commutator B B, so that while alternating currents are supplied to rings D D continuous currents will when the armature is running in synchronism be led off in shunt to the armature from said commutator through the circuit of coils E E, which at such time is closed.

A switch operated in any suitable way by hand or automatically and of any desired construction is typified by a lever F, bearing insulated plates which serve to bridge sets of contacts in pairs, as shown, by means of which the several circuits of the organization may be made and broken as follows: Set $a$ controls connection between supply-wire L and one side of commutator B. Set $a'$ controls connection between one terminal of field-coils C C and the opposite main or supply wire L'. Wires L and L' are supposed in this case to be of constant potential. Said coils being connected into the commutator B and one another, as shown, it is obvious that when the switch is in the position shown there is a direct connection from wire L to L' through armature and field C C in series, and the motor will run and come to synchronous speed like any continuous or direct current motor or dynamo fed by alternating currents. Set $b$ controls connection between main L and one ring D D and set $b'$ the connection between the other ring and the opposite main L'. When the switch is moved to break at $a$ and $a'$, it closes on $b$ and $b'$, thus feeding alternating currents directly into the armature-coils in well-known way. The latter connections are made when the armature attains synchronism. In the latter position of the switch it also closes connection at contacts $c$ in the circuit of coils E, which circuit also includes the devices whereby the field may be made to increase in strength with the load during synchronous running and by its increased strength to hold the armature up to speed. These devices may be of any desired character known in the art as suitable for regulating the strength of current supplied from any desired source or the action of the current in producing a magnetic field by magnetizing-coils, combined with suitable controlling or actuating devices responsive to or varying in action according to the load on the motor, so as to increase the field with the load. As an instance of such devices I show in Fig. 1 a variable resistance R in the circuit of coils E and a controlling device therefor, consisting of an electromagnet connected directly or indirectly with the circuit which feeds the motor-armature during synchronous operation, said magnet serving directly or indirectly to operate on the arm of the variable resistance, so as to decrease the resistance as the load increases and increase the current in coils E. In the present instance the armature or core of the magnet is shown connected directly to the adjustable arm of the rheostat in order to typify controlling devices operating as above stated. Any other device varying or capable of being varied as the load varies might be used for controlling or operating on the resistance, as well understood in the art.

As an instance of an equivalent means connected into the circuit of coils E for the purpose of varying the strength of the field produced by them, I illustrate in Fig. 2 a field-coil a portion of which is divided into sections connected to a range of contacts over which the contact-arm moves in the same way as in Fig. 1, with the exception that the number of coils in action in Fig. 2 increases with the load, thereby increasing the strength of field. At the start the switch closes contacts $a\ a'$ and opens $b\ b'\ c$. The motor then operates as a non-synchronous motor and accelerates. When it reaches synchronous speed, the switch is turned, opening $a$ and $a'$ and closing $b$, $b'$, and $c$. The motor then operates as a synchronous motor and is kept up to synchronous speed, as already described.

It is obvious that the field-coil for synchronous operation regulated in action, as herein described and claimed, may be used with any style of alternating-current motors, whether run by single-phase or multiple-phase currents and irrespective of the means or method of bringing the motor to synchronous speed.

What I claim as my invention is—

1. The combination with a self-starting alternating-current motor, of a field coil or circuit for synchronous operation provided with means for throwing it into action in conjunction with means for regulating its action and causing the field to increase with the load, after synchronism is attained.

2. The combination with a motor constructed in any suitable way to be self-starting under the action of (single-phase) alternating current, of a continuous-current field-coil for synchronous operation, and means in the circuit thereof for regulating the field to cause it to increase with an increase of load.

3. An alternating-current motor having an exciting field-coil supplied from its armature when running in synchronism, in combination with means for regulating the action of said coil to cause it to increase in power with the load, as and for the purpose described.

4. An alternating-current motor having two field-coils, one of which is a series coil in circuit with the armature for starting the machine as a non-synchronous motor, while the other operates as the field for synchronous running, in combination with means for regulating the current in the latter coil to cause it to increase with an increase of the load.

5. An alternating-current motor having an armature wound with a direct-current generator or motor-winding for self-starting, and a field-coil in shunt to the armature during synchronous operation, and provided with means for varying its action so that it will increase in power with an increase of load.

6. In a self-starting alternating-current motor, a field-magnet for synchronous operation excited by current taken from a direct or continuous current winding—of the armature in combination with means for regulating said current to cause it to increase with an increase of load.

7. In a self-starting alternating-current motor having a direct or continuous current armature-winding and commutator operated in series with a field-coil for starting or non-synchronous operation, the combination of a switch for connecting a suitable field-coil in shunt to the armature when synchronism is attained, and means for regulating the current in said coil to cause it to increase with the load during synchronous operation.

8. In a self-starting alternating-current motor having a field and armature in series during non-synchronous operation, the combination of an exciting-circuit, a field-coil included in said circuit, and means for regulating the field to cause it to increase in power with an increase in load during synchronous operation.

Signed at New York, in the county of New York and State of New York, this 20th day of February, A. D. 1897.

ALEXANDER J. CHURCHWARD.

Witnesses:
WM. H. CAPEL,
D. H. DECKER.